United States Patent
Wu et al.

(10) Patent No.: US 8,862,560 B1
(45) Date of Patent: Oct. 14, 2014

(54) COMPRESSION SYSTEM PAUSE AND AUTO-RESUME

(75) Inventors: Yuanjie Wu, Shanghai (CN); Yue Zhao, Shanghai (CN); Peiyu Zhuang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 768 days.

(21) Appl. No.: 12/819,767

(22) Filed: Jun. 21, 2010

(51) Int. Cl.
*G06F 17/30* (2006.01)

(52) U.S. Cl.
USPC ............................ 707/693; 707/694; 707/696

(58) Field of Classification Search
None
See application file for complete search history.

(56) References Cited

U.S. PATENT DOCUMENTS

| | | | | |
|---|---|---|---|---|
| 6,038,033 | A * | 3/2000 | Bender et al. ............... | 358/1.16 |
| 6,681,305 | B1 * | 1/2004 | Franke et al. ................ | 711/170 |
| 6,779,088 | B1 * | 8/2004 | Benveniste et al. .......... | 711/145 |
| 7,587,572 | B1 * | 9/2009 | Stenstrom .................... | 711/173 |
| 7,975,109 | B2 * | 7/2011 | McWilliams et al. ........ | 711/147 |
| 2003/0188121 | A1 * | 10/2003 | Roy et al. ..................... | 711/171 |
| 2004/0088284 | A1 * | 5/2004 | Gourlay et al. ................ | 707/3 |
| 2007/0118712 | A1 * | 5/2007 | van Riel et al. .............. | 711/170 |
| 2007/0226428 | A1 * | 9/2007 | Tremaine et al. ............ | 711/154 |
| 2008/0013365 | A1 | 1/2008 | Yueh | |
| 2008/0306977 | A1 * | 12/2008 | Karuppiah ................... | 707/101 |
| 2008/0307188 | A1 * | 12/2008 | Franaszek et al. ........... | 711/171 |
| 2009/0089507 | A1 * | 4/2009 | Chen et al. ................... | 711/125 |
| 2009/0271589 | A1 | 10/2009 | Karpoff et al. | |
| 2010/0332778 | A1 * | 12/2010 | Wada ........................... | 711/162 |
| 2011/0072227 | A1 | 3/2011 | Patterson | |
| 2011/0107052 | A1 * | 5/2011 | Narayanasamy ............. | 711/171 |

* cited by examiner

*Primary Examiner* — Mohammad S Rostami
(74) *Attorney, Agent, or Firm* — BainwoodHuang

(57) ABSTRACT

A method is provided within a storage processor of a data storage system having a fixed storage capacity shared between a plurality of data storage units, The method includes (a) performing a Compression-related operation on a data storage unit of the plurality of data storage units using a free pool of storage space, associated with the fixed storage capacity, as a swap space for the Compression-related operation, (b) detecting a size of the free pool, the size of the free pool representing unallocated storage space of the data storage system, (c) comparing the size of the free pool with a restricted threshold, and (d) if the size of the free pool falls below the restricted threshold, then pausing the Compression-related operation on the data storage unit, otherwise, continuing to perform the Compression-related operation on the data storage unit. Apparatus and computer program product for practicing the method are also provided.

16 Claims, 3 Drawing Sheets

COMPRESSION SYSTEM PAUSE AND AUTO-RESUME

BACKGROUND

Users within an enterprise environment often store data on large data storage systems. Typically, these data storage systems are organized into multiple logical units of data (LUNs). Often, for example, in a backup context, it is desirable to store one or more of these LUNs in a compressed format in order to maximize the use of storage space.

In some enterprise data storage systems, it is possible to perform a compression operation one or more LUNs within the system. Because compression operations require temporary swap space, these compression operations can only be performed if sufficient storage space is available.

SUMMARY

Unfortunately, conventional data storage systems suffer from deficiencies. In particular, if a compression operation is initiated when insufficient space is available to successfully complete that operation, the operation may fail, and, in some cases, data may be lost. Embodiments of the present invention cure these deficiencies by providing for an automatic pause feature that allows for a controlled pause before failure.

In one embodiment, a method is provided within a storage processor of a data storage system having a fixed storage capacity shared between a plurality of data storage units. The method includes (a) performing a Compression-related operation on a data storage unit of the plurality of data storage units using a free pool of storage space, associated with the fixed storage capacity, as a swap space for the Compression-related operation, (b) detecting a size of the free pool, the size of the free pool representing unallocated storage space of the data storage system, (c) comparing the size of the free pool with a restricted threshold, and (d) if the size of the free pool falls below the restricted threshold, then pausing the Compression-related operation on the data storage unit, otherwise, continuing to perform the Compression-related operation on the data storage unit.

An apparatus and computer program product for practicing the method are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments are directed to techniques for providing an automatic pause feature for Compression-related operations in a data storage system. By using the automatic pause feature, Compression-related errors can be minimized.

Figure 1:
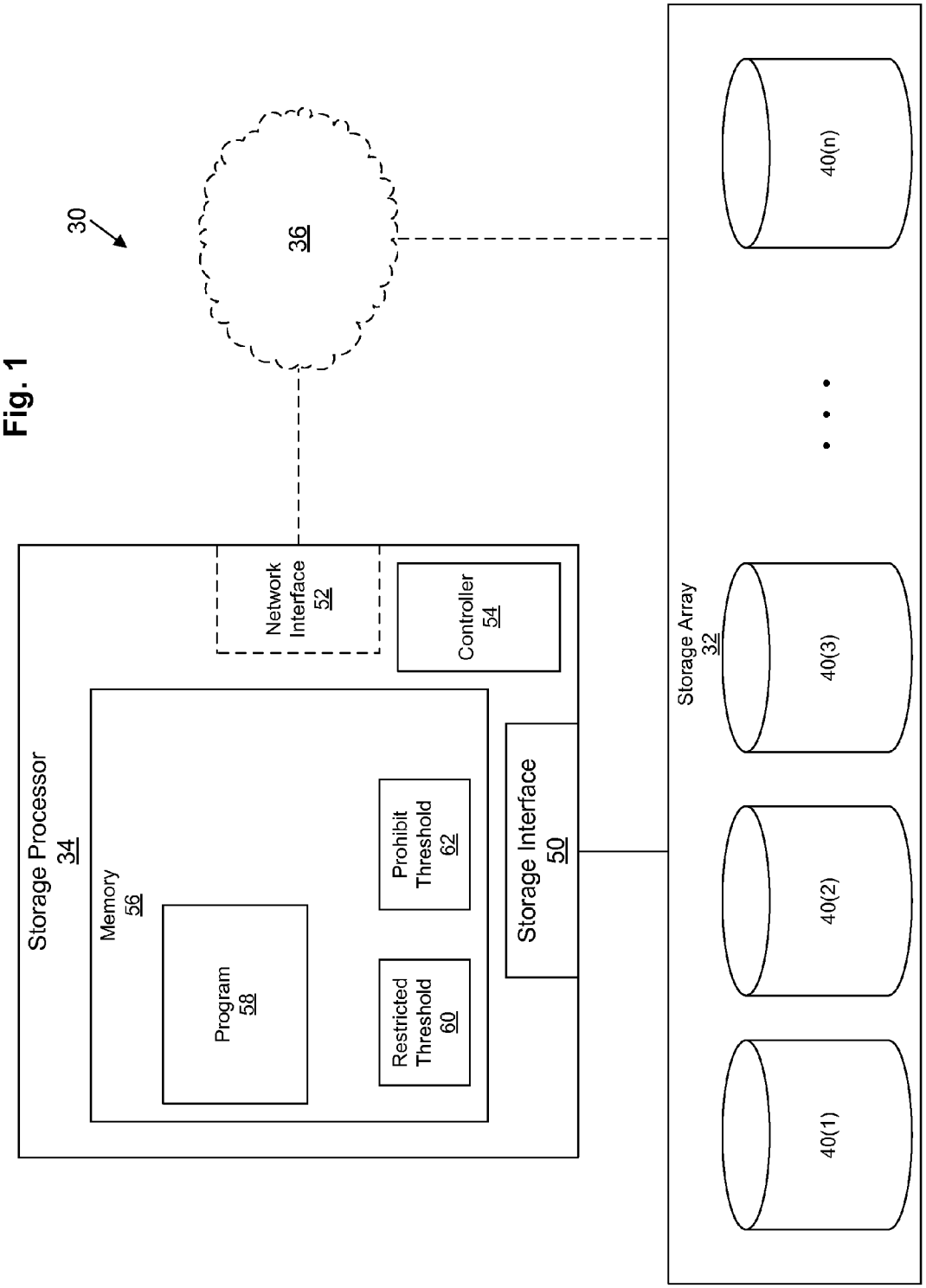
FIG. 1 illustrates an example data storage system according to one embodiment.

FIG. 1 depicts an example data storage system 30 for use in practicing various embodiments. Data storage system 30 includes a storage array 32, a storage processor 34, and, optionally, a network 36. Although storage array 32 and storage processor 34 are depicted separately, in some embodiments, storage array 32 and storage processor 34 are arranged within a single housing. Storage array 32 contains a plurality of disks 40 (depicted as n disks 40(1), 40(2), ..., 40(n)) which provide storage space for the data storage system 30. Disks 40 may be electromagnetic or optical disks or they may be memory-based storage devices or any other form of data storage devices. Storage array 32 has a fixed capacity that is equal to the sum of the capacities of each of the component disks 40. Although this is described as a fixed capacity, it can change, for example, if a disk is removed or added to the storage array 40 or if a disk or portion thereof fails. If storage array 32 is arranged as a redundant array (such as according to one of the RAID standards), then only the logical capacity, after excluding redundant portions, is counted towards the fixed capacity.

Storage processor 34 includes a storage interface 50 for interfacing with and communicating with storage array 32, an optional network interface 52 for interfacing with network 36 (for example, to receive storage commands from hosts on the network 36), a controller 54, and memory 56. Controller 54 may be any sort of controller, such as, for example, a general purpose processor or microprocessor, a central processing unit, or a set of dedicated circuitry designed to perform particular operations in hardware. Memory 56 may be made up of one or more of the following: volatile random access memory, non-volatile read-only memory, non-volatile flash memory, magnetic storage, optical storage, etc. In one embodiment, memory 56 stores a computer program 58. Computer program 58 contains a set of instructions to be executed by processor 54 in order to carry out one or more embodiments. Memory 56 also stores the values of a restricted threshold 60 and a prohibit threshold 62.

Figure 2:
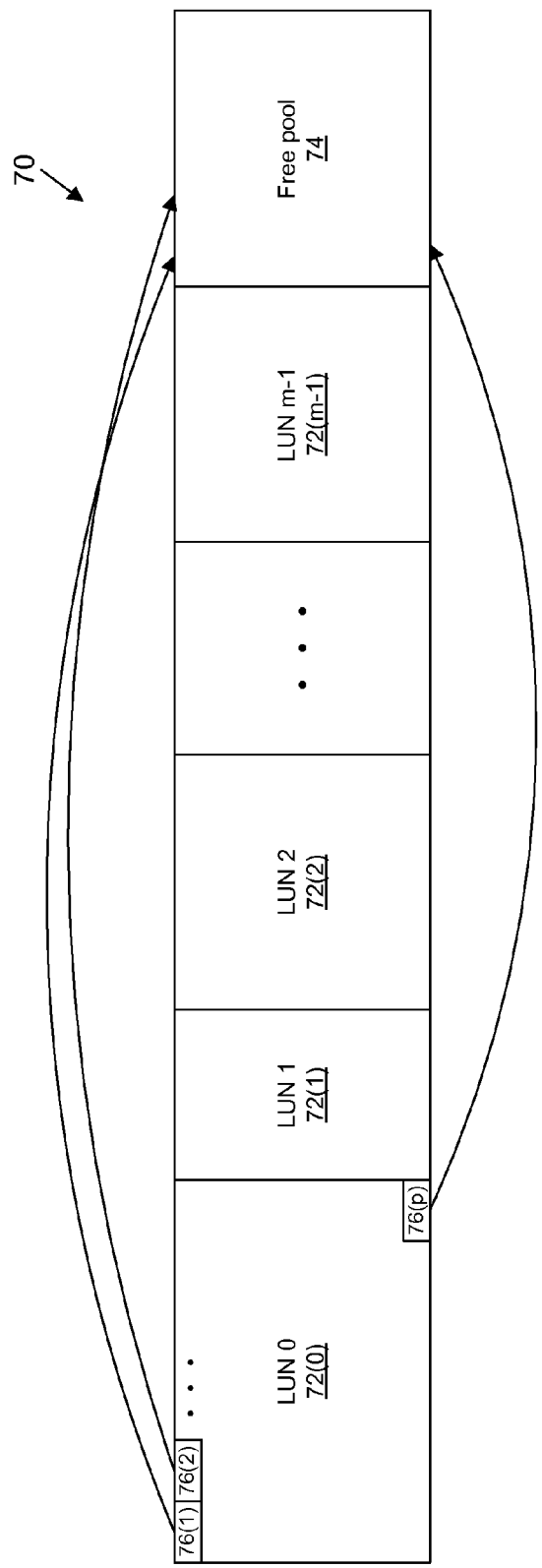
FIG. 2 illustrates an example logical structure of the data storage system of FIG. 1 according to one embodiment.

FIG. 2 depicts an example logical structure 70 of the contents of storage array 32. In a typical arrangement, disks 40 of storage array 32 are arranged in a redundant array of inexpensive disks (RAID), with a plurality of logical units of data (LUNs) striped across the various disks 40. Logical structure 70 includes a total of m LUNs 72 (depicted as LUNs 72(0), 72(1), ..., 72($m-1$)) and a free pool 74. LUNs 72 may be so-called thin LUNs, which are allocated space on an as-needed basis from the free pool 74. For example, storage array 32 may contain a total of 1000 gigabytes (GB) of storage space. In this example, LUN 0 72(0) may currently be allocated 300 GB, LUN 1 72(1) allocated 100 GB, LUN 2 72(2) allocated 200 GB, and LUN 3 72(3) allocated 200 GB (with m=4). In that case, free pool 74 would contain 1000−300−100−200−200=200 GB of storage space. If additional space is needed by one of the LUNs 72, additional space may be allocated from the 200 GB within free pool 74, thereby reducing the size of the free pool 74. For example, if LUN 0 72(0) needs an additional 20 GB of space, the new size of LUN 0 72(0) would be 320 GB and the new size of free pool 74 would be 180 GB.

Each LUN 72 is made up of a plurality of data blocks 76 (depicted as 76(1), 76(2), ..., 76($p$) only within LUN 0 72(0) for clarity). LUN 0 72(0), as depicted, contains a total of p blocks 76. If each block 76 is 4096 bytes and LUN 0 72(0) is exactly 300 GB in size, then p=78,643,200. The block size may be 4096 bytes, 2048 bytes, 8192 bytes, or any other block size used by a file system or operating system.

In some cases, it is desirable to utilize compression techniques to reduce the size allocated to each LUN 72. In order to achieve the general goal of compression, a set of Compression-related operations are used. Compression-related operations are operations that are used in order to compress or decompress data. One Compression-related operation is a compression operation, which reduces the size of a LUN 72 by removing redundant data in accordance with well-understood compression algorithms. Another Compression-related operation is a decompression operation, which expands the size of a previously-compressed LUN 72 by reversing the compression in accordance with well-understood decompression algorithms. It should be noted that although well-understood compression and decompression algorithms have been mentioned, newer compression and decompression algorithms may be used instead.

In performing a compression operation (which, it should be noted, is performed by storage processor 34), data may be compressed on a chunk-by-chunk basis. For example, a chunk may consist of 64 kilobytes (KB) of data. If the block 76 size is 4 KB, then each chunk consists of 16 blocks 76. Each chunk may be compressed individually, and if the compressed size uses 15 or fewer blocks 76 (i.e., saving at least one block 76), then the compressed chunk replaces the original chunk, thereby allowing 1 or more blocks to be removed from the allocated size of the LUN 72. While performing this compression, scratch space (also known as swap space) is needed. For example, when the compression algorithm is first applied to the chunk, the compressed chunk must be stored in scratch space so that it can be compared to the original chunk. Only once the compressed chunk is verified to save at least one block 76 relative to the original chunk may the compressed chunk be written back to the LUN 72 and then the original chunk erased. In some cases, it may be desirable to compress and verify several chunks before the compressed chunks are copied back to the LUN 72 and the original chunks erased (so that the data can be arranged more contiguously). A decompression operation may similarly be performed on a chunk-by-chunk basis.

For the scratch space, the free pool 74 may be utilized. Thus, referring back to the example provided above, if LUN 0 72(0) is being compressed, then scratch space may be used within the 200 GB of the free pool. If the free pool is not large enough to fully contain the scratch space, then the compression operation could fail unless it is paused in accordance with various embodiments.

Figure 3:
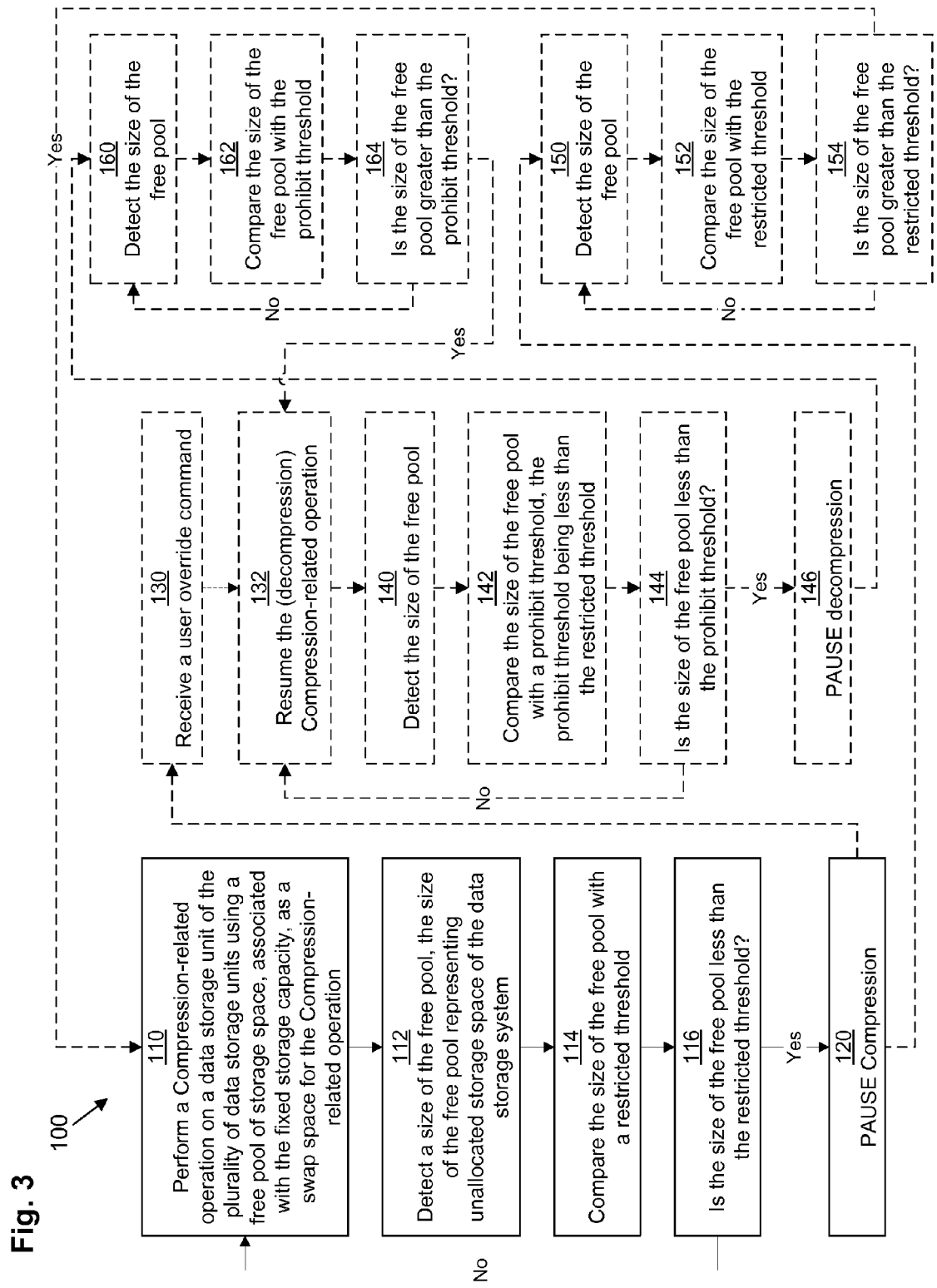
FIG. 3 is a flowchart that illustrates a procedure performed within the data storage system of claim 1 according to one embodiment.

FIG. 3 depicts method 100 of performing a Compression-related operation according to various embodiments. The basic, general method has five steps, steps 110, 112, 114, 116, and 120. Additional optional steps may be performed in some embodiments.

In step 110, storage processor 34 performs a Compression-related operation. It should be understood that whenever storage processor 34 is described as performing an action, it is the controller 54 that performs the operation or causes the operation to be performed (in some embodiments, by performing a step stored in computer program 58). The storage processor 34 performs the Compression-related operation on a particular LUN 72 and uses free pool 74 as a swap space (or scratch space). In one embodiment, the Compression-related operation is a compression operation. In another embodiment, the Compression-related operation is a decompression operation. These embodiments will be illustrated in additional detail below.

In step 112, storage processor 34 detects the size of the free pool 74. For example, storage processor 34 detects the difference between the fixed capacity and the sum of the allocated capacities of all the LUNs 72. In step 114, storage processor 34 compares the detected size of the free pool 74 with the value of the restricted threshold 60 stored in memory 56. The restricted threshold 60 should be at least large enough to hold several chunks worth of data. In one embodiment, the value of the restricted threshold is 5% of the fixed capacity. In the example presented above, that would be 50 GB.

In step 116, storage processor 34 branches execution based on the comparison. If the free pool 74 is not less than the restricted threshold 60, then execution continues with step 110. Thus, as long as the free pool 74 retains sufficient space (at least as large as the restricted threshold 60), the Compression-related operation can continue. But, if the free pool 74 does not have sufficient space, storage processor 34 performs step 120 and pauses execution of the Compression-related operation. This pausing prevents compression or decompression from continuing when there may not be enough scratch space in the free pool 74 to safely complete operation.

In one embodiment, steps 112-116 are performed after each chunk of data is compressed (or decompressed) and stored in the free pool 74. In another embodiment, steps 112-116 are performed just before each chunk of data is compressed (or decompressed) and stored in the free pool 74. In other embodiments, these steps are performed less often, such as after every 10 or 1000 chunks. The less often steps 112-116 are performed, the larger the restricted threshold 60 needs to be.

Once the Compression-based operation has been paused, there are several ways to terminate the pause and continue the Compression-based operation.

If the Compression-based operation is a decompression operation, then a user, such as a system administrator, has the option to issue a user override command. In step 130, storage processor receives a user override command. Following such receipt, the storage processor resumes the decompression operation in step 132. This allows a LUN 72 to be decompressed even if the free pool is smaller than the restricted threshold. This can be helpful if the data in the LUN 72 needs to be accessed quickly.

Upon resuming the decompression operation in step 132, in one embodiment, storage processor 34 performs steps 140, 142, and 144 in order to further compare the size of the free pool 74 against the value of the prohibit threshold 62 stored in memory 56. The prohibit threshold 62 is set to a value smaller than the restricted threshold 60. Thus, for example, if the restricted threshold 60 is 5% of the fixed capacity, the prohibit threshold 62 could be set to 2% of the fixed capacity. As with steps 112-116, steps 140-144 may be performed before or after every chunk is decompressed or after several chunks have been decompressed.

In step 140, storage processor 34 detects the size of the free pool 74. In step 142, storage processor 34 compares the detected size of the free pool 74 with the value of the prohibit threshold 62 stored in memory 56. In step 144, execution branches based upon the comparison. If the free pool 74 is smaller than the prohibit threshold 62, then the amount of scratch space is considered to be so perilously low that even a user should not be able to override the pause, so the storage processor 34 pauses compression again in step 146. However, if the free pool 74 is not smaller than the prohibit threshold 62, then the decompression operation may continue and execution continues back at step 132.

The pause operation of step 120 may be further expanded with reference to steps 150-154. When a Compression-related operation is paused, the pause need only last as long as the size of the free pool 74 remains smaller than the restricted threshold 60. Thus, upon pausing, storage processor 34 enters a repetitive loop to determine if the free pool 74 has expanded. The free pool 74 could expand if a user deletes a LUN 72 or deletes data within a LUN 72, causing the allocated size of that LUN 72 to decrease (the freed area reverting to the free pool 74). The free pool 74 could also expand if a decompression operation being performed in parallel on another LUN 72 reduces the size of that LUN and reverts free space back to the free pool 74.

In step 150, storage processor checks the current size of the free pool 74. Then, in step 152, storage processor 34 compares the current size of the free pool 74 with the value of the restricted threshold 60. In step 154, if the size of the free pool 74 has increased back above the restricted threshold 60, then execution continues with step 110, returning to the original Compression-related operation. However, if the size of the free pool 74 has not increased back above the restricted threshold 60, then execution continues with step 150, returning to the pause loop.

It should be noted that pause step 146 has a similar structure to pause step 120. Thus, when a decompression operation has paused a second time after the prohibit threshold 62 has been reached (following a user override), the storage processor 34 repeatedly compares the current size of the free pool 74 to the prohibit threshold 62 (or, in one embodiment, the restricted threshold 60) to determine if execution can proceed back to step 132. Thus, the pause operation of step 146 may be further expanded with reference to steps 160-164.

In step 160, storage processor checks the current size of the free pool 74. Then, in step 162, storage processor 34 compares the current size of the free pool 74 with the value of the prohibit threshold 62. In step 164, if the size of the free pool 74 has increased back above the prohibit threshold 62, then execution continues with step 132, returning to the decompression operation. However, if the size of the free pool 74 has not increased back above the prohibit threshold 62, then execution continues with step 160, returning to the pause loop.

In order to better illustrate, an example is now provided. Initially, storage array 32 has 4 uncompressed LUNs 72. LUN 0 72(0) is 300 GB, LUN 1 72(1) is 100 GB, LUN 2 72(2) is 200 GB, and LUN 3 72(3) is 200 GB. If the fixed capacity of the storage array 32 is 1000 GB, then the free pool 74 is initially 200 GB. Let the restricted threshold 60 be 50 GB and the prohibit threshold be 20 GB. In order to save space (e.g., if a user desires to store an additional LUN in storage array 32), a user may initiate a command to compress LUN 0 72(0). When the storage processor 34 receives this request, program 58 is executed by controller 54 to compress LUN 0 72(0). Controller 54 tries to compress each 64 KB chunk of LUN 0 72(0) in sequence and stores the compressed versions of these chunks in free pool 74. Several chunks may actually be compressed in parallel to take advantage of multiple cores and various latencies. Thus, perhaps 1000 chunks are compressed and stored in free pool 74. Some compressed chunks will take up less than 64 KB, while other compressed chunks may take up the same 64 KB or even more than 64 KB. Any chunks that take up less than 60 KB (thereby saving at least 1 block 76 of storage space) may be copied back to LUN 0 72(0). For example, perhaps 700 of the 1000 chunks would be 60 KB or less and copied back to LUN 0 72(0), while the remaining 300 chunks would be greater than 60 KB and therefore not copied back. If the average chunk that is copied back saves 1.5 blocks 76, then the 1000 chunks on LUN 0 72(0), instead of taking up the original 64 KB×1000=64 MB would instead take up about 59.9 MB, allowing 1,050 blocks 76 to be released from LUN 0 72(0) and allocated back to the free pool 74. After the first 1000 chunks have been compressed, storage processor 34 performs steps 112-116 to determine if there is enough space in free pool 74 to continue the compression operation. Since 1,050 blocks 76 have now been released back to the free pool 74, free pool 74 now has a size of about 200.004 GB. Since this exceeds 50 GB (the restriction threshold 60), the compression operation may continue without pausing. Assume that after the compression operation has been completed, compressed LUN 0 72(0) now has a size of 230 GB instead of 300 GB. Now, the free pool 74 has 270 GB. Happy about all the new free space, the user decides to create a new LUN 72, LUN 4, with size 240 GB. 240 GB of space from the free pool 74 is allocated to LUN 4, so now the free pool only has 30 GB.

At this point, user may wish to decompress LUN 0 72(0) so that it can be accessed more quickly. Thus, user will initiate a decompression command on LUN 0. The first 1000 chunks will be decompressed into free pool 74. But, then upon executing steps 112-116, storage processor 34 will determine that the size of the free pool is only 30 GB, which is less than the 50 GB restricted threshold 60. Thus, decompression will pause (step 120), and the user will be notified. However, since the user is anxious to access the data in LUN 0 72(0), the user issues an override command to the storage processor 34. Thus, the decompression operation will continue with steps 132-144. Since, after decompressing the first 1000 chunks, an additional 1,050 blocks 76 will need to be allocated back to LUN 0 72(0), the size of the free pool 74 will shrink to about 29.996 GB. However, since this is still above the prohibit threshold 62 of 20 GB, the decompression operation may proceed back to step 132. It will progress along, however, approximately ⅐ of the way through decompressing LUN 0 72(0), the size of the free pool 74 will drop below 20 GB. Once that happens, the next time step 144 is reached, storage processor 34 will determine that the size of the free pool 74 is now less than the prohibit threshold 62. Thus, the decompression operation will pause in step 146.

Even if the user were to issue an override command, it would be of no use because a user override command is only helpful for decompression cases where the restricted threshold 60 has been violated, but not the prohibit threshold 62. If the user wants to continue the operation, he may choose to delete LUN 1 72(1), which will free 100 GB into the free pool 74. Now, since free pool 74 has about 120 GB, the pause (step 146) may terminate (since the comparison in steps 162 and 164 will indicate that the size of the free pool 74 now exceeds the prohibit threshold 62), allowing LUN 0 72(0) to fully decompress.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. In a storage processor of a data storage system having a fixed storage capacity shared between a plurality of data storage units, a method comprising:
performing a Compression-related operation on a data storage unit of the plurality of data storage units using a free pool of storage space, associated with the fixed storage capacity, as a swap space for the Compression-related operation;
detecting a size of the free pool, the size of the free pool representing unallocated storage space of the data storage system;
comparing the size of the free pool with a restricted threshold; and
if the size of the free pool falls below the restricted threshold, then pausing the Compression-related operation on the data storage unit, otherwise, continuing to perform the Compression-related operation on the data storage unit;
wherein each of the data storage units and the free pool are all fully provisioned from non-volatile storage provided by the data storage system;
wherein each of the plurality of data storage units is a thinly-provisioned logical disk, a size of each thinly-provisioned logical disk dynamically varying based on the contents of that thinly-provisioned logical disk;
wherein performing the Compression-related operation on the data storage unit comprises performing a decompression operation on the data storage unit to expand the size of the data storage unit from a compressed state;
wherein the method further comprises:
in response to pausing, receiving a user override command; and
in response to receiving the user override command, resuming the decompression operation.

2. A method as in claim 1 wherein:
performing the decompression operation includes performing the decompression operation on a chunk-by-chunk basis; and
comparing the size of the free pool includes comparing the size of the free pool with the restricted threshold after decompression of each chunk.

3. A method as in claim 1 wherein the method further comprises, in response to pausing:
detecting the size of the free pool; and
comparing the size of the free pool with the restricted threshold;
if the size of the free pool increases relative to the restricted threshold, then resuming the Compression-related operation on the data storage unit, otherwise, continuing to pause the Compression-related operation on the data storage unit.

4. A method as in claim 1 wherein the fixed storage capacity is equal to a combined size of the plurality of data storage units plus the size of the free pool.

5. A method as in claim 1 wherein performing the Compression-related operation on the data storage unit of the plurality of data storage units using the free pool of storage space, associated with the fixed storage capacity, as the swap space for the Compression-related operation includes:
processing a chunk of data of the data storage unit using a Compression-related algorithm to generate a processed data chunk;
temporarily storing the processed data chunk in the swap space, using the swap space as a scratch space; and
copying the processed data chunk from the swap space to the data storage unit in place of the chunk of data.

6. A method as in claim 1 wherein receiving the user override command is performed manually.

7. In a storage processor of a data storage system having a fixed storage capacity shared between a plurality of data storage units, a method comprising:
performing a Compression-related operation on a data storage unit of the plurality of data storage units using a free pool of storage space, associated with the fixed storage capacity, as a swap space for the Compression-related operation, wherein performing the Compression-related operation on the data storage unit comprises performing a decompression operation on the data storage unit to expand the size of the data storage unit from a compressed state;
detecting a size of the free pool, the size of the free pool representing unallocated storage space of the data storage system;
comparing the size of the free pool with a restricted threshold;
if the size of the free pool falls below the restricted threshold, then pausing the Compression-related operation on the data storage unit, otherwise, continuing to perform the Compression-related operation on the data storage unit;
in response to pausing, receiving a user override command;
in response to receiving the user override command, resuming the decompression operation; and
in response to resuming the decompression operation:
detecting the size of the free pool;
comparing the size of the free pool with a prohibit threshold, the prohibit threshold being less than the restricted threshold; and
if the size of the free pool falls below the prohibit threshold, then pausing the decompression operation on the data storage unit, otherwise, continuing to perform the decompression operation on the data storage unit.

8. A method as in claim 7 wherein:
the restricted threshold is 5% of the fixed storage capacity; and
the prohibit threshold is 2% of the fixed storage capacity.

9. A method as in claim 7 wherein receiving the user override command is performed manually.

10. An apparatus comprising:
memory;
an interface for communicating with a plurality of data storage units of a data storage system, the data storage system having a fixed storage capacity shared between the plurality of data storage units; and
a controller, the controller being configured to:
perform a Compression-related operation on a data storage unit of the plurality of data storage units using a free pool of storage space, associated with the fixed storage capacity, as a swap space for the Compression-related operation, wherein the controller, when performing the Compression-related operation on the data storage unit, is configured to perform a decompression operation on the data storage unit to expand the size of the data storage unit from a compressed state;

detect a size of the free pool, the size of the free pool representing unallocated storage space of the data storage system;

compare the size of the free pool with a restricted threshold;

if the size of the free pool falls below the restricted threshold, then pause the Compression-related operation on the data storage unit, otherwise, continue to perform the Compression-related operation on the data storage unit;

in response to pausing, receive a user override command;

in response to receiving the user override command, resume the decompression operation; and in response to resuming the decompression operation:
   detect the size of the free pool;
   compare the size of the free pool with a prohibit threshold, the prohibit threshold being less than the restricted threshold; and
   if the size of the free pool falls below the prohibit threshold, then pause the decompression operation on the data storage unit, otherwise, continue to perform the decompression operation on the data storage unit.

11. An apparatus as in claim 10 wherein:
the controller, when performing the decompression operation, is configured to perform the decompression operation on a chunk-by-chunk basis; and
the controller, when comparing the size of the free pool, is configured to compare the size of the free pool with the restricted threshold after decompression of each chunk.

12. An apparatus as in claim 10 wherein:
the restricted threshold is 5% of the fixed storage capacity; and
the prohibit threshold is 2% of the fixed storage capacity.

13. An apparatus as in claim 10 wherein the controller is further configured to, in response to pausing:
detect the size of the free pool;
compare the size of the free pool with the restricted threshold; and
if the size of the free pool increases relative to the restricted threshold, then resume the Compression-related operation on the data storage unit, otherwise, continue to pause the Compression-related operation on the data storage unit.

14. An apparatus as in claim 10 wherein receiving the user override command is performed manually.

15. A computer program product comprising a non-transitory computer-readable storage medium storing a set of instructions, which, when executed by a processor, cause the processor to:

perform a Compression-related operation on a data storage unit of a plurality of data storage units of a data storage system using a free pool of storage space, associated with a fixed storage capacity shared between the plurality of data storage units, as a swap space for the Compression-related operation;

detect a size of the free pool, the size of the free pool representing unallocated storage space of the data storage system;

compare the size of the free pool with a restricted threshold; and if the size of the free pool falls below the restricted threshold, then pause the Compression-related operation on the data storage unit, otherwise, continue to perform the Compression-related operation on the data storage unit;

wherein each of the data storage units and the free pool are all fully provisioned from non-volatile storage provided by the data storage system;

wherein each of the plurality of data storage units is a thinly-provisioned logical disk, a size of each thinly-provisioned logical disk dynamically varying based on the contents of that thinly-provisioned logical disk;

wherein performing the Compression-related operation on the data storage unit comprises performing a decompression operation on the data storage unit to expand the size of the data storage unit from a compressed state;

wherein the set of instructions, when executed by the processor, further cause the processor to:
   in response to pausing, receive a user override command; and
   in response to receiving the user override command, resume the decompression operation.

16. A computer program product as in claim 15 wherein receiving the user override command is performed manually.

* * * * *